United States Patent [19]

van der Lely

[11] 4,160,358

[45] Jul. 10, 1979

[54] FEEDING WAGONS

[76] Inventor: Cornelis van der Lely, 7, Brüschenrain, Zug, Switzerland

[21] Appl. No.: 707,568

[22] Filed: Jul. 21, 1976

[30] Foreign Application Priority Data

Jul. 23, 1975 [NL] Netherlands .......................... 7508767
Apr. 22, 1976 [NL] Netherlands .......................... 7604253

[51] Int. Cl.² .......................... A01D 87/00; A01K 5/00
[52] U.S. Cl. .......................................... 56/344; 56/364; 119/60
[58] Field of Search .................................. 56/344–364; 119/58, 60, 59

[56] References Cited

U.S. PATENT DOCUMENTS

| | | | |
|---|---|---|---|
| 1,237,543 | 8/1917 | Morrison | 56/345 |
| 3,269,359 | 8/1966 | Kuchenbecker | 119/59 |
| 3,782,333 | 1/1974 | Feterl | 119/58 |
| 3,901,008 | 8/1975 | Taylor et al. | 56/344 |
| 3,906,901 | 9/1975 | Cox | 119/58 |
| 3,999,520 | 12/1976 | Feberl | 119/58 |
| 4,020,794 | 5/1977 | Nethery | 119/58 |
| 4,030,274 | 6/1977 | Reber et al. | 56/364 |

FOREIGN PATENT DOCUMENTS

1198112 8/1965 Fed. Rep. of Germany ............. 56/344
6509136 1/1967 Netherlands ............................... 56/364

*Primary Examiner*—Jay N. Eskovitz
*Attorney, Agent, or Firm*—Penrose Lucas Albright; William B. Mason

[57] ABSTRACT

A feeding wagon has a wheeled frame and a reinforced, enclosed receptacle with an entrance through which crop can be loaded. The receptacle can be attached to the frame by hydraulic cylinder and swash plate assemblies that engage coupling points on upwardly extending supports that are fastened at the sides of the receptacle. The swash plates are pivoted to lift the receptacle onto the frame with the aid of guides. A crop feeding device, including a pick up and advancing member on an auxiliary frame, is connected to the front of the receptacle frame adjacent the entrance. After the receptacle is loaded by the device, it is transported to a site and separated from the frame. The sidewalls of the receptacle have openings that can be exposed so that cattle can withdraw fodder until the receptacle has been emptied. In the meanwhile, a second receptacle can be loaded by the same feeding device and on the same wheeled frame.

60 Claims, 20 Drawing Figures

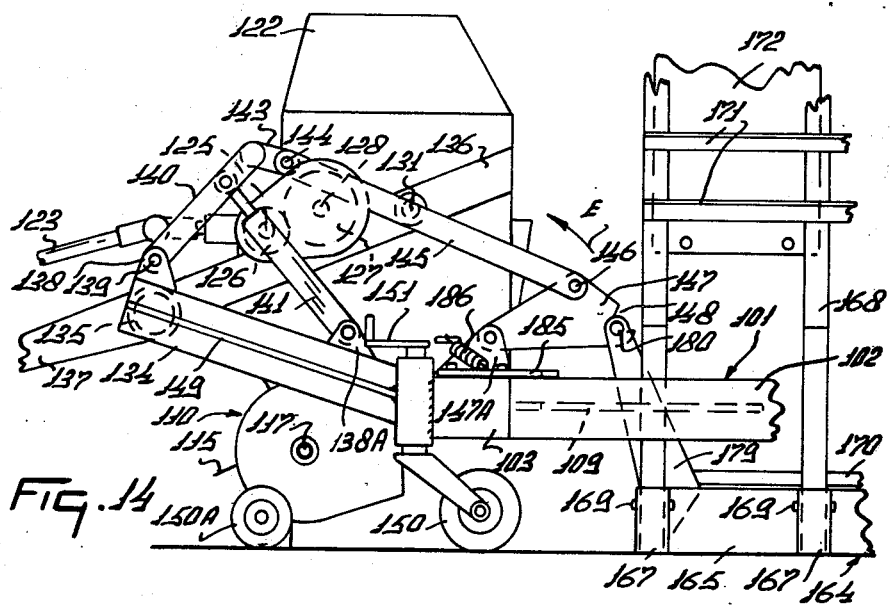
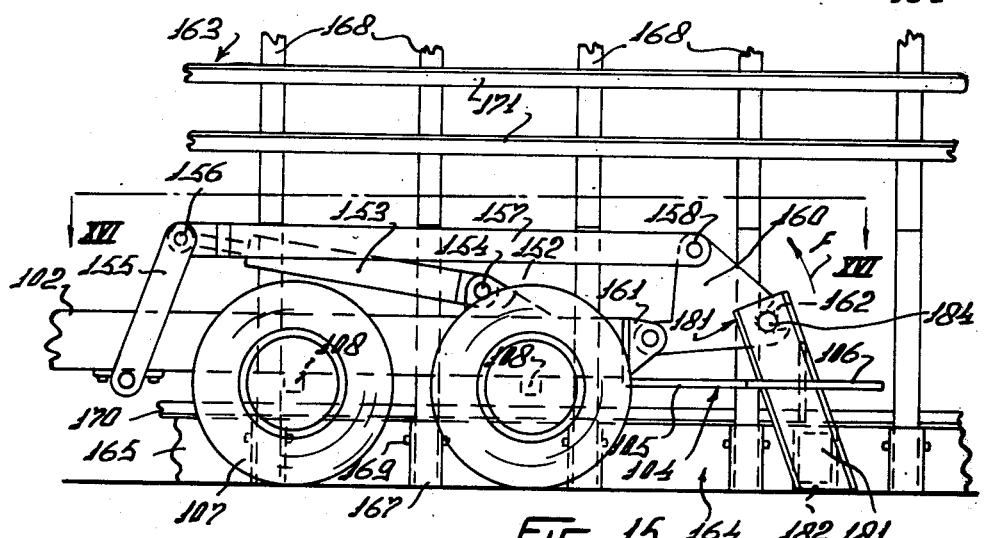
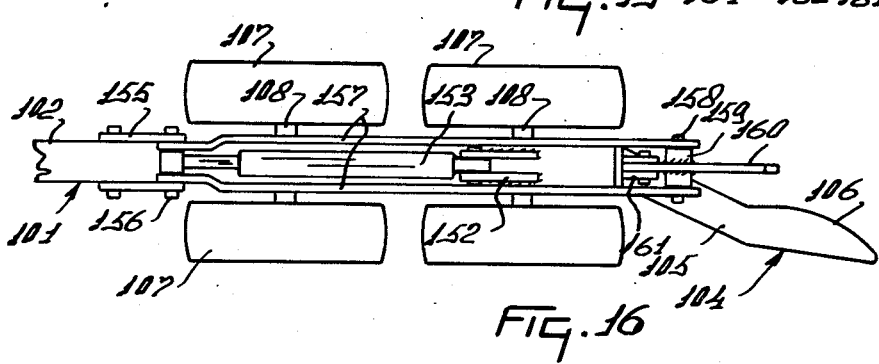

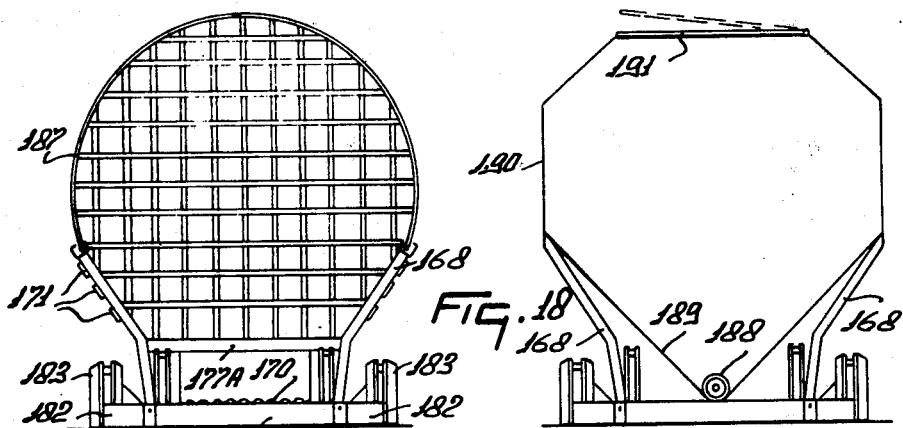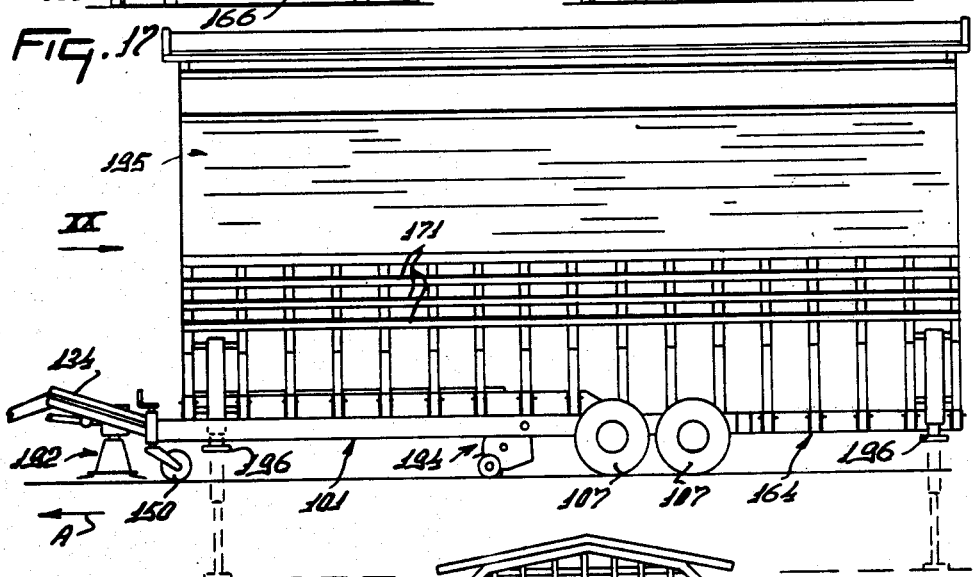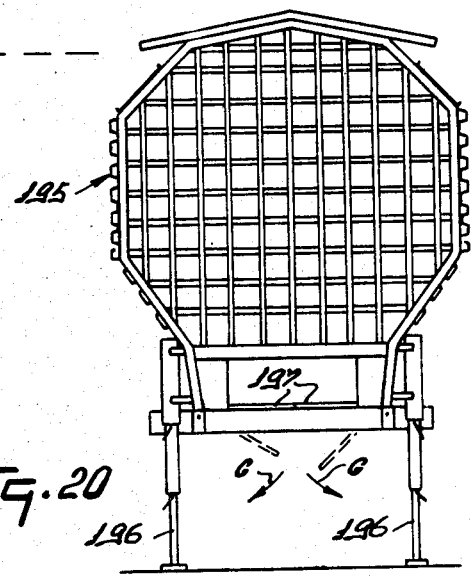

FEEDING WAGONS

SUMMARY OF THE INVENTION

According to the present invention there is provided a feeding wagon for cattle comprising a groundwheel supported frame holding a receptacle from which cattle can withdraw crop, and a crop feeding device with which the wagon can be provided, at least during loading of the wagon, this crop feeding device including a pick-up member for picking up crop lying on the ground and an advancing member co-operating with the pick-up member for carrying the crop so picked-up into the receptacle.

For a better understanding of the invention and to show how the same may be carried into effect, reference will now be made, by way of example, to the accompanying drawings, in which:

BRIEF DESCRIPTION OF THE DRAWINGS

FIG. 14 shows on an enlarged scale a foremost part of the wagon of FIGS. 8 to 11 during the operation of coupling the crop receptacle to the wagon, FIG. 15 shows on an enlarged scale a rearmost part of the wagon of FIGS. 8–11 during the operation of coupling the receptacle to the wagon, FIG. 16 is a plan view of the wagon taken in the direction of the arrows XVI—XVI in FIG. 15 with the crop receptacle uncoupled, FIG. 17 is a front view of a further embodiment of crop receptacle, FIG. 18 is a front view of another embodiment of crop receptacle, FIG. 19 is a side view of a further embodiment of a wagon with a crop receptacle coupled thereto, and FIG. 20 is a front view of the crop receptacle shown in FIG. 19.

DESCRIPTION OF THE PREFERRED EMBODIMENTS

Figure 1:
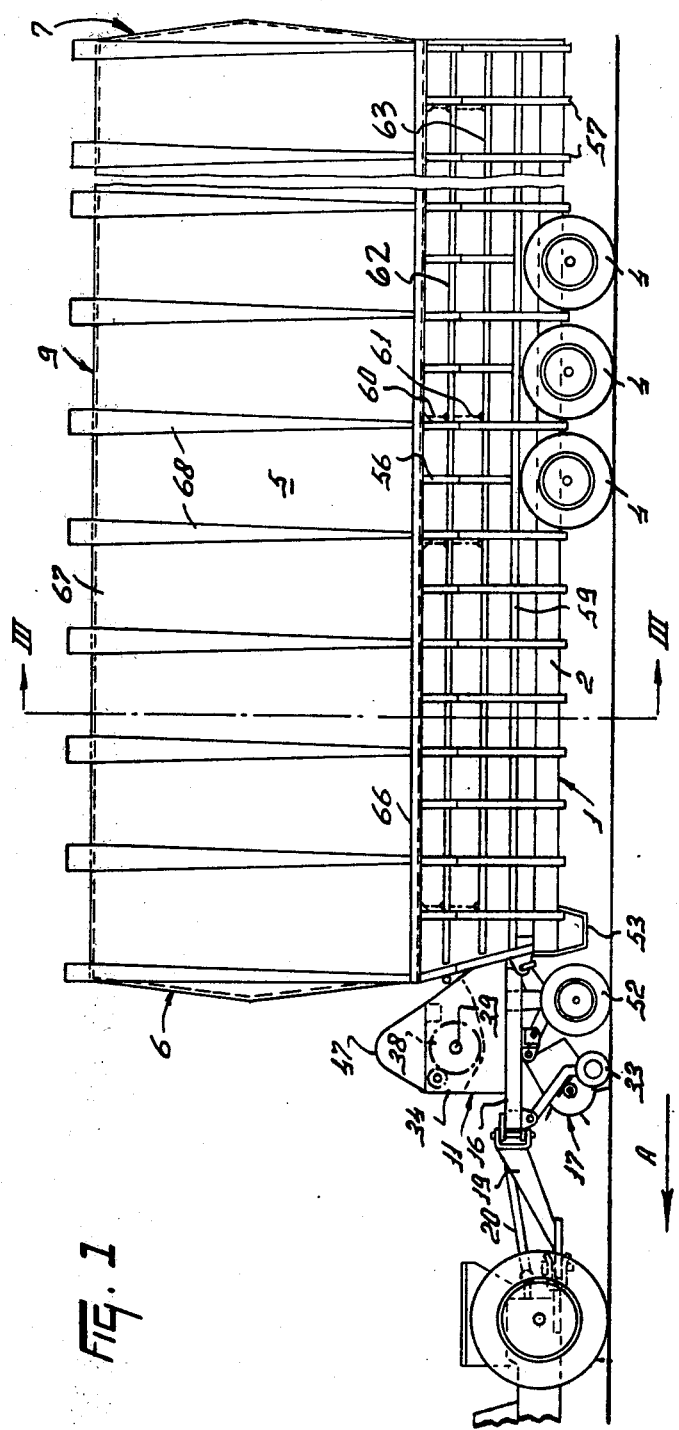
FIG. 1 is a schematic side view of a feeding wagon provided with a crop feeder.

The crop feeding or forage wagon shown in FIGS. 1 to 4 has a frame 1 that includes two frame beams 2 extending in the direction of length of the feeding wagon on either side thereof and interconnected, inter alia by a frame beam 3. The wagon is supported from a plurality of ground wheels 4. Preferably three such wheels are arranged on each side of the wagon. The feeding wagon furthermore has upright side walls 5, a front wall 6 and a rear wall 7. A floor 8 (shown in FIG. 3) is arranged between the frame beam 2. The sidewalls 5, the front wall 6, the rear wall 7 and the floor 8, together with a roof 9, enclose a crop receptacle 10.

Figure 2:
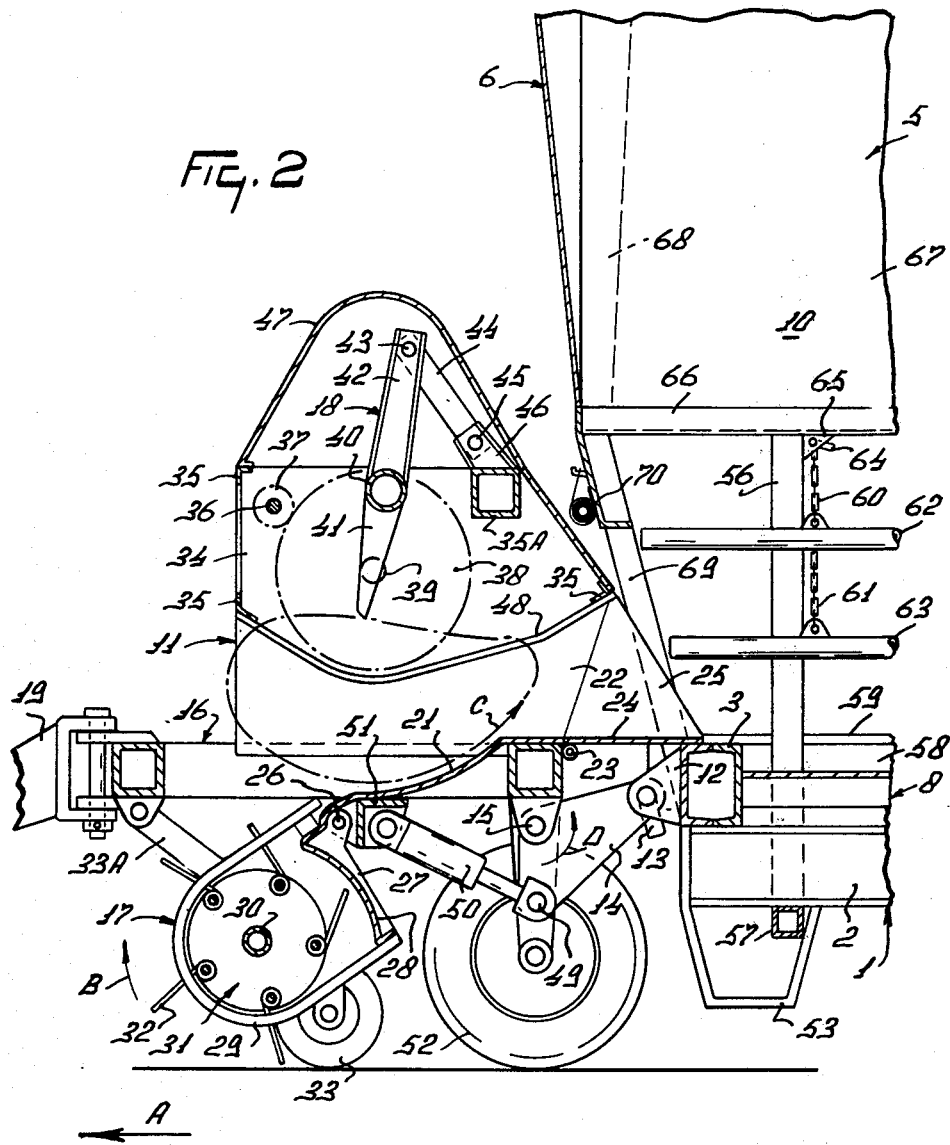
FIG. 2 is an enlarged sectional view of the crop feeder and the front part of the feeding wagon of FIG. 1.

The crop feeder 11 is provided near the front of the frame beam 3, coupled to the wagon by means of coupling means formed by fork-shaped parts 12 on each side of the wagon, between each of which an arm 14 can be coupled with the aid of a locking or coupling pin 13. The arms 14 are connected with an auxiliary frame 16 so as to be pivotable about a horizontal shaft 15 extending transversely of the intended direction of operative travel A of the wagon, the auxiliary frame 16 being preferably formed by hollow beams and having, viewed on plan, an approximately rectangular shape. The frame 16 carries the operative portions of the feeder 11, which include a pick-up member 17 pivoted to the auxiliary frame 16 near the bottom at the front of this frame, and an advancing member 18 located obliquely above the pickup member 17, as shown in FIG. 2. Each coupling pin 13 serves, in addition, as a horizontal, pivotal shaft extending transversely of the direction of travel A between the wagon and the crop feeder 11. Near the front the auxiliary frame 16 is pivotally connected with a drawbar 19, by means of which the wagon can be attached to a tractor, whose power take-off shaft can be linked to an auxiliary shaft 20. The auxiliary shaft 20 drives the pick-up member 17 and the advancing member 18 in known manner through transmission gears of conventional structure.

FIG. 2 shows that on the top of the auxiliary frame 16 a plate 21 is fastened throughout the width of the auxiliary frame in a position inclined forwardly and downwardly away from the rear part of the frame 16, upright rims 22 of which plate are bent over at right angles. Near the rear a substantially horizontal plate 24 joining the plate 21 is adapted to pivot about a horizontal shaft 23 extending transversely of the direction of travel A and near its rear end this plate 24 joins the frame beam 3. Bent-over rims 25 of the plate 24 join the upright rims 22. The upright rims 22 and the bent-over rims 25 are relatively disposed so that, when the rear part of the feeder 11 turns about the shaft 23, the rims 22 and the rims 25 can slide along one another. Near the lower part of the plate 21 bearings are provided to support a horizontal shaft 26 at right angles to the direction of travel A. Two plates 27 near the sides of the wagon are freely rotatable about the shaft 26. The plates 27 extend forwardly away from the shaft 26 and are interconnected by means of a curved plate 28, extending transversely of the direction of travel A. The curved plate 28 has secured to it the ends of a U-shaped beam 29. Bearings secured to the plates 27 hold a shaft 30. The shaft 30 is associated with a roller or drum 31 of the pick-up member 17, to which spring steel tines 32 are secured. The tines 32 are controlled in a known manner (as shown in U.S. Pat. No. 828,552) so that, when turning about the shaft 30 in the direction of the arrow B (FIG. 2), they extend at least substantially radially near the lower part of the path, whereas near the upper part of their path the tines 32 extend tangentially. On either side of the feeder ground wheels 33 are pivotally connected by means of wheel carriers 33A with the auxiliary frame 16, and are coupled via a slotted connecting member with the pick-up member 17 for supporting the pick-up member 17 adapted to turn about the shaft 26. The wheels 33 are preferably used for adapting the pick-up member 17 to unevennesses of the ground.

Above the auxiliary frame 16 plates 34 extend vertically upwards from the plate 22 and are interconnected by a plurality of horizontal beams 35 and 35A, extending at right angles to the direction of travel A. Bearings secured to the plates 24 hold a horizontal shaft 36 at right angles to the direction of movement. Pinions 37 are provided near the ends of the shaft 36 located near the plates 34. The teeth of the pinions 37 are in mesh with the teeth of gear wheels 38 secured to stub shafts 39 extending parallel to the shaft 36 and journalled in bearings fastened to the plates 34.

Bearings, secured to the peripheries of gear wheels 38 forming a driving member, hold a tube 40 of the advancing member 18. The tube 40 extends parallel to the shaft 36 and is provided with a plurality of tines 41 arranged, viewed in the direction of the tube, in a row one behind the other and extending downwardly away from the tube 40. At each end of the tube 40 an arm 42 extends upwardly from the tube, the arms 42 being in line with the tines 41, viewed in the direction of length of the tube. The ends of the arms 42 remote from the tube 40 are pivotally coupled with the ends of coupling rods 44 by means of pins 43 extending parallel to the tube 40. The ends of the coupling rods 44 remote from the arms 42 are pivotally coupled with ears 46 to the frame beams 35A with the aid of pins 45 extending parallel to the pins 43. This advancing member 18 is protected by a screening hood 47, the rear wall of which is inclined rearwardly and downwardly to the rear of the feeder 11. On the bottom the member 18 is screened by a plurality of relatively spaced beams 48, the ends of which are secured to the beams 35. From the front end each beam 48 has a downwardly inclined portion at an angle of about 30° to the horizontal, extending to the rear and terminating near the vertical plane going through the rotary axis of the gear wheels 38 (formed by the stub shafts 39) in an upwardly inclined portion at an angle of about 15° to the horizontal. The beams 48 are spaced apart by a distance such that the tines 41 can pass between the beams 48.

In the paths described by the tines 41 a plurality of cutters may be arranged in a manner not shown for cutting the crop into short lengths. The number of, and the spacing between the cutters is chosen in accordance with the desired length of the cuttings.

By means of a pivotal shaft 49 located beneath the pivotal shaft 15 a hydraulic cylinder 50 of the single action type is pivoted to each arm 14. At the end remote from the pivotal shaft 49 each cylinder 50 is pivoted to a horizontal beam 51 extending transversely of the direction of travel A and secured to the lower side of the auxiliary frame 16 near the front of the plates 21. Near the rear the auxiliary frame 16 is supported from two ground wheels 52 located one on each side. These ground wheels 52 support not only the auxiliary frame 16, but in operation also the front of the frame 1 of the wagon. To this end, by means of the hydraulic cylinders 50 the arms 14 can be turned with respect to the pivotal shaft (formed by the pins 13) as a result of which two supports 53 provided one on each side of the wagon beneath the frame beams at the front of the wagon are lifted from the ground (condition illustrated in FIGS. 1 and 2). The supports 53 viewed from the side, have a trapezoidal shape. If desired, extensible legs may be provided at the front for holding the front of the wagon at the adjusted height above the ground when the crop feeder 11 is uncoupled from the wagon.

The lower part of the wagon comprises a plurality of tubular beams 54 (FIG. 3) curved substantially in the shape of a U, viewed in the direction of travel A. Viewed from the side the beams 54 (FIG. 1) are arranged at equal distances apart of about 50 cms throughout the length of the wagon. The web between the upright limbs of each substantially U-shaped beam 54 is formed by a bottom beam 55 having, viewed in the direction of travel A (FIG. 3), an upwardly extending bend so that the two upwardly converging parts of the beam 55 are at an angle of about 7.5° to the horizontal. The limbs of each substantially U-shaped beam 54 are formed by beams 56 converging in downward direction and being at an angle of about 65° to the horizontal. At about two-thirds of the height of each beam 56 a tubular stiffening beam 57 extends from outside one upright limb to outside the other upright limb. Viewed in the direction of travel A each beam 57 has an approximately U-shaped form, the upright limbs of which at first diverge in downward direction and then, from the level of the tops of the wheels 4, converge to the web, which is secured to the bottoms of the frame beams 2 and runs horizontally between the beams 2. The bottom beams 55 are provided with a steel sheet of about 3 mms in thickness, forming the floor 8. At the corners of the beams 54 plates 58 on each side of the wagon extend away from the frame beam 2 in an upwardly inclined position along the beams 56. Above the wheels 4 they are bent over outwardly and horizontally. The plates 58 extend in the direction of travel A throughout the length of the wagon. The plates 58, each of which forms a feeding gutter or trough, are secured by means of tubes 59 to the inner faces of the outermost portions of the stiffening beams 57. Viewed on plan and transversely of the direction of travel A, the width of each feeding trough corresponds at least substantially with the width of an apertured lower part of the corresponding sidewall 5. Near the top of the beams 56, on the inner sides thereof, on each side of the wagon two horizontal tubular rods 62 and 63 are suspended from chains 60 and 61 respectively so as to extend in the direction of travel A throughout the length of the wagon. Viewed from the side (FIG. 1) the rods 62 and 63 divide the space between the tops of the beams 56 and the tubes 59 into three portions of substantially equal heights. The chains 60 and 61 are secured by means of pins 64 to plates 65, which are secured near the top ends of the beams 56.

In the regions of the feeding troughs formed by the plates 58, the sidewalls 5 have a plurality of openings provided over the whole length of the wagon, their height being about 100 cms, measured in a vertical direction. The beams 56 are disposed between the openings to prevent an excessive outflow of fodder when the cattle are feeding.

Figure 3:
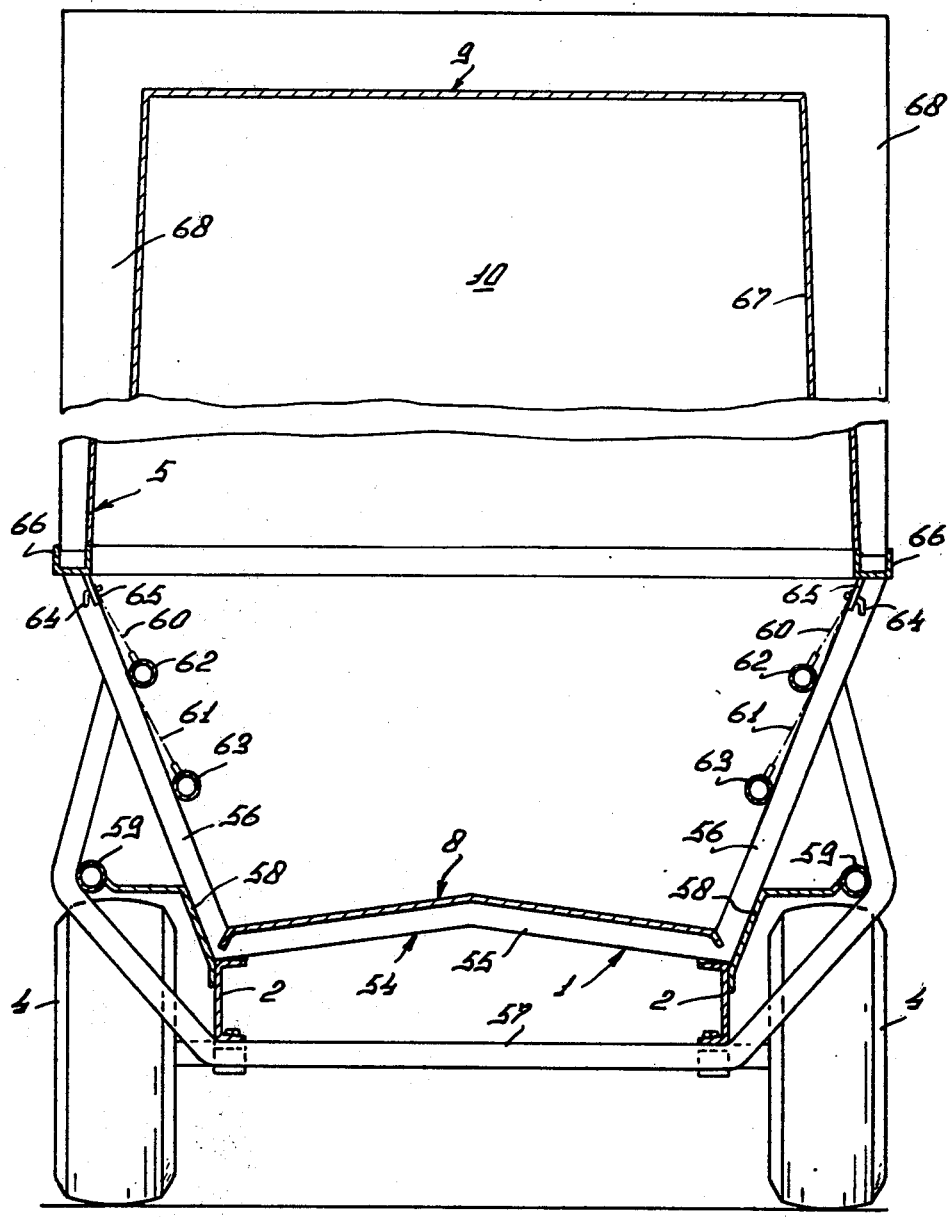
FIG. 3 is a sectional view of the wagon taken on the lines III—III in FIG. 1.
Figure 4:
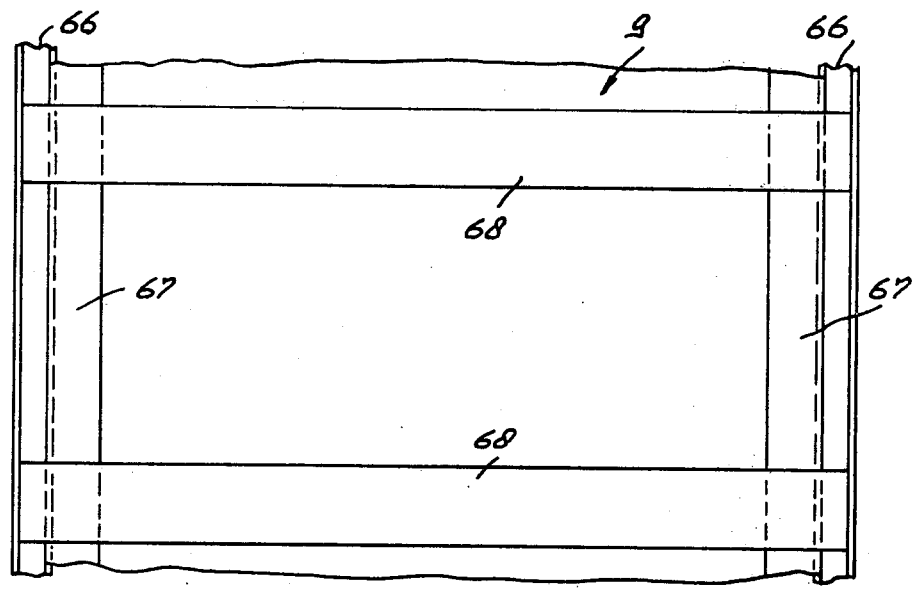
FIG. 4 shows part of a roof of the wagon taken in the direction of the arrow IV in FIG. 3.

The top ends of the beams 56 are provided with horizontal, channel section beams 66, the limbs of which extend upwardly. The beams 66, arranged around the wagon, viewed on plan, stiffen the sidewalls 5, the front wall 6 and the rear wall 7. The beams 66 have secured to them the upper parts of the sidewalls 5 of the crop receptacle 10 these walls being made from profiled steel sheet preferably of about 3 mms in thickness. Viewed in the cross section of FIG. 3, the sidewalls 5 above the beams 66 together with the roof 9 form an integral, uninterrupted plate 67. Profiled reinforcements of the steel plate 67 formed by portions 68 prolonged along the roof are shaped so that the plate 67 and the portions 68 have the shape of a U, viewed in the direction of travel A and in cross section, the ends of the limbs of this U join the beams 66. The profiled portions 68 are proportioned so that the upwardly extending portions 68 along the sidewalls 5, near the top of the wagon, in a horizontal cross-section, have a larger length and width than near the beams 66. The horizontal cross-section is preferably approximately square, the dimensions near the beams 66 being about 6×6 cms and near the top of the wagon about 20×20 cms. In the sectional view of FIG. 3 the outer circumference of each profiled portion 68 has an approximately rectangular shape and near the roof 9 the profiled portion 68 is at a height of about 4 meters about the ground and the width of the U-shaped portion 68 is about 2.10 to 3 ms, preferably about 2.50 ms. The plate 67 enclosing the receptacle 10 has a substantially trapezoidal shape as shown in FIG. 3. The two upwardly converging inner walls of the sidewalls 5 formed by the plate 67 are each at an angle of about 3° to the vertical, longitudinal plane of symmetry of the wagon. Viewed from the side (FIG. 1) the portions 68 are distributed along the sidewalls 5 so that a portion 68 joins every other beam 56. For the purpose of draining rainwater the junction between the plate 67 and the profiled portions 68 with the beam 66 is such that water is conducted by the uninterrupted steel plate 67 towards the gutter formed by the beams 66 (FIG. 4), this gutter having openings near the front or rear of the wagon or both, through which the water can escape. Through openings at equal intervals in the beam 66, water can be conducted away via the beams 56 through openings in the bottom beam 55. Water contained in the wagon can flow away laterally along the slightly inclined bottom plate 8 to be conducted away near the corners of the U-shaped hollow beams 54.

The plate 67 is joined by the front and rear walls 6 and 7 respectively, also made from steel sheet of about 3 mms in thickness. It is advantageous to construct the rearwall 7 so that it can be opened for discharging the crop, if desired, or for carrying out other operations in the receptacle 10. Near the bottom the front wall 6 has a substantially rectangular opening 69, through which the crop is pushed by the advancing member 18 into the receptacle 10. When the crop feeder 11 is uncoupled and removed from the wagon the opening 69 can be closed by means of a rolling screen 70.

Figure 5:
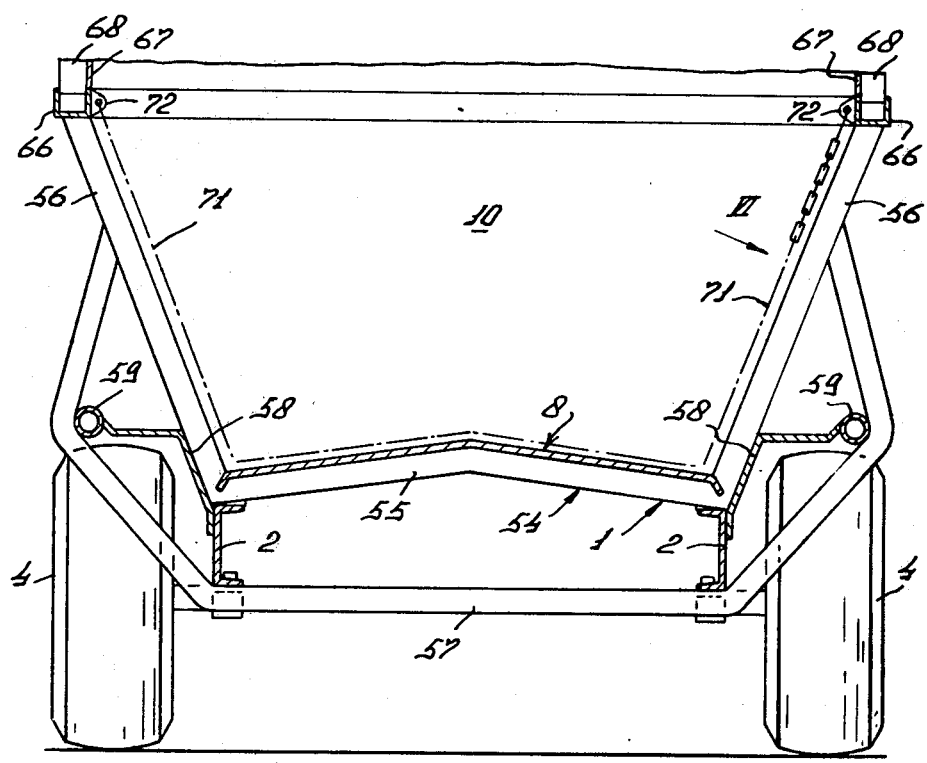
FIG. 5 shows a second embodiment of part of the wagon taken on the lines III—III in FIG. 1.
Figure 6:
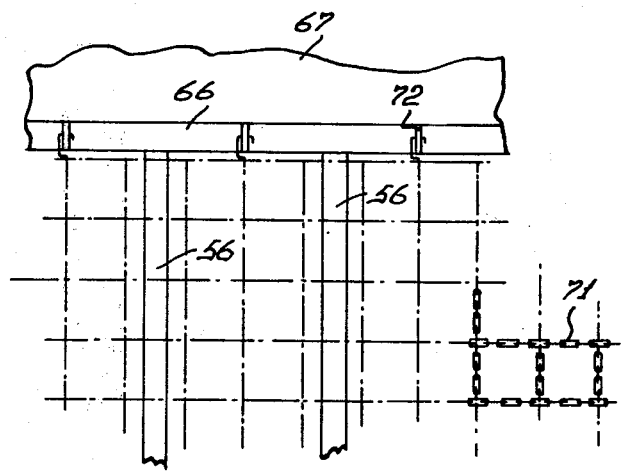
FIG. 6 illustrates a detail of the wagon of FIG. 5 taken in the direction of the arrow VI in FIG. 5.
Figure 8:
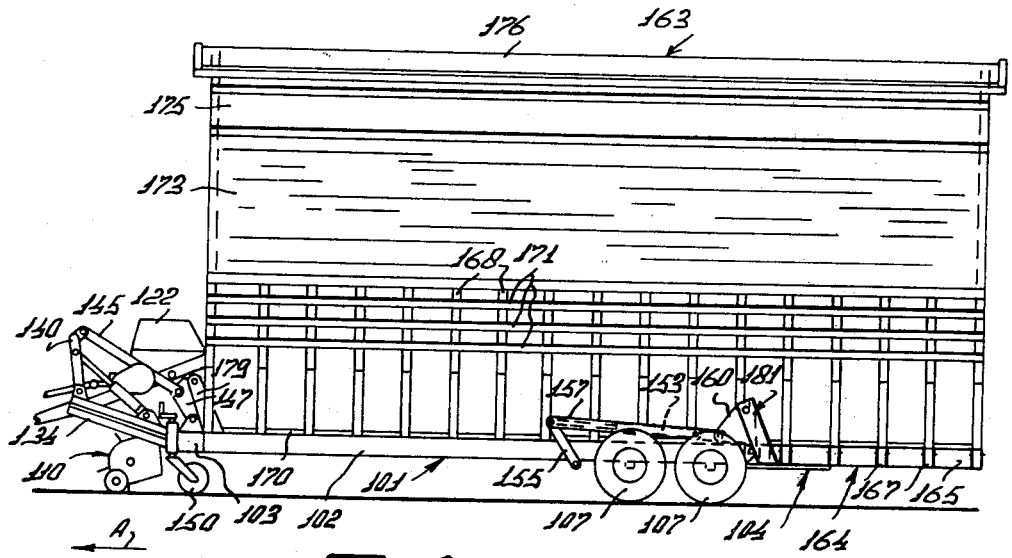
FIG. 8 is a side view of a third embodiment of the wagon, shown provided with a crop feeder, and also with a crop receptacle.
Figure 9:
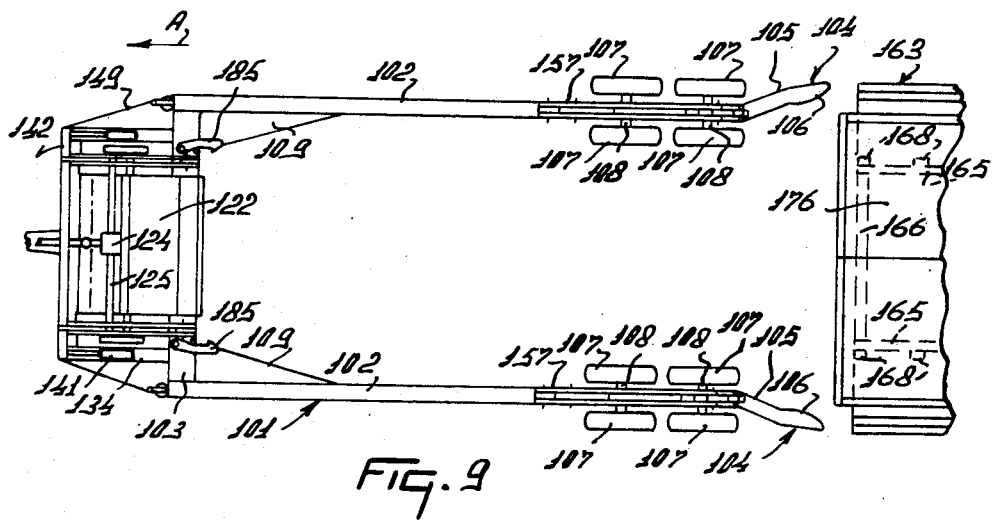
FIG. 9 is a plan view showing the wagon of FIG. 8 and a part of the crop receptacle which has been uncoupled from the wagon and removed therefrom.

FIGS. 5 and 6 show a replacement for the rods 62 and 63 in the form of chain network or screen 71 fastened to the inner side of the lower part of the receptacle 10. The chain network 71 preferably consists of meshes of approximately square shape having dimensions of about 15×15 cms. Viewed in the cross-section of FIG. 5, the chain network is suspended near the top with the aid of tags 72 on the inner sides of the beams 66, the chain network 71, from the beam 66 on one side, being inclined away from the tags 72 along the beam limbs 56 on this side in downwardly direction, then extending along the bottom beams 55 and subsequently being inclined upwardly along the opposite beam limbs 56 to the opposite beam 66. Near the corners of the U-shaped beams 54 the chain network 71 may have further fastening points, if desired.

The crop feeding or forage wagon described above operates as follows.

The wagon can be coupled with the aid of the drawbar 19 and with the crop feeder 11 attached to a tractor or a similar vehicle and can be moved in the direction of the arrow A. The operative parts of the crop feeder 11, formed by the pick-up member 17 and the advancing member 18, can be driven through a driving mechanism not shown in the Figures from the power take-off shaft of the vehicle drawing the wagon. The drum of the pick-up member 17 is rotated in the direction of the arrow B, whereas the free ends of the tines 41 of the advancing member 18 are moved in the direction of the arrow C along a reniform path. This reniform path is essentially such that the crop is inserted approximately in a horizontal direction into the crop receptacle 10.

While the crop is being picked up, the wheels 33 bear on the ground for supporting the pick-up member 17 so that the latter can match unevennesses of the ground. Crop lying on the ground is caught by the tines 32 and pushed upwards through the gap between the parts of the plates 27 located in front of the beams 29. The beams 29 serve as scrapers for the tines 32 for preventing the crop from sticking to the tines. The diameter of the drum 31 is such that the drum carries the crop up to the level of the floor 8 of the wagon. The crop lifted by the tines 32 is taken over by the tines 41 and pushed in an at least substantially horizontal direction rearwardly into the receptacle 10, the tines 41 mowing between the scrapers formed by the beams 48. The positions of the beam 48 and the movement of the tines 41 are such that the angle of engagement between the crop and the sides of the tines 41 is always larger than 90° to minimize jamming of crop between the tines 41 and the beams 48. As already mentioned, if desired with respect to the nature of the crop, cutters may be disposed in the reniform path of the tines in a manner not shown for cutting up the crop.

Owing to the construction described above for the advancing member 18 associated with the crop feeder 11 the crop is inserted in an at least substantially horizontal direction into the crop receptacle of the feeding wagon, and the crop located inside does not slide back into the feeder channel, while the comparatively large quantities of crop simultaneously inserted into the receptacle ensure a satisfactory advancement of the crop into the receptacle.

To couple the crop feeder 11 with the wagon the arms 14 are coupled with the front of the feeding wagon which can then be lifted after the coupling pins 13 have been put in place, by turning the arms 14 about the shaft 15 in the direction of the arrow D, the desired relationship between the feeder and the wagon being thus established. Since the feeder 11 itself is supported from the ground wheels 52 on each side it is advantageous that in operation the feeder device and the wagon can turn relatively to one another about the shaft formed by the coupling pins 13. The rear part of the feeder device, formed by the plate 24 and the rims 25, is capable of turning about the shaft 23 with respect to the remainder of the feeder device, which is desirable with a view to a satisfactory junction between the feeder device and the transverse beam 3 of the wagon.

In operation crop is pushed by the tines 41 through the opening 69 in the front wall 6 of the wagon into the receptacle 10. When the feeder 11 is uncoupled, the opening 69 is closed by the screen 70 so that loaded crop cannot get out of the wagon in an undesirable manner. When the feeder 11 is removed, the wagon is supported at the front by the supports 53, or by the extensible legs if these are provided.

The disposition of the three wheels 4 on each side of the wagon is such that only slight pressure is exerted on the front of the wagon.

Depending upon circumstances the wagon may have fewer or more than the three compartments.

As already mentioned, the cattle feed from openings in the two sidewalls. During the loading operation these openings are closed at least partly by means of the rods 62 and 63. For supplying the load of crop to the cattle it is only necessary to disengage the pins 64 so that the rods 62 and 63 slide down to the floor 8. The rods 62 and 63 are constructed so that, when suspended during the loading operation, the rods offer minimum resistance to the crop, when this is pushed rearwardly, while on the other hand the rods prevent loss of crop from the crop receptacle. The rods 62 and 63 may consist of, for example, five portions, each portion being suspended separately. In this way openings for the cattle can be realized according to need. In the alternative embodiment of FIGS. 5 and 6 in which the rods 62 and 63 are replaced by the chain network 71, this chain network prevents substantially all loss of crop. If desired, the rods 62 and 63 may be arranged on the inner side of the receptacle 10 and the chain network 71 on the outer side of the receptacle.

The trough-shaped feeding gutters 58 beneath the openings in the sidewalls 5, on either side of the wagon, serve for preventing loss of fodder falling from the openings. By constructing the floor plate 8 so that away from the vertical, longitudinal plane of symmetry of the wagon the floor is inclined downwardly, even a small residue of crop in the wagon can be taken by the cattle. Moreover, any liquid can flow away in a lateral direction.

Owing to the completely closed construction of the top parts of the walls 5 and the roof 9 the crop in the loading space 10 is very effectively protected from weather conditions. Rain is conducted away through the gutters 66 and, if desired, connections via the beams 56 may be used for conducting the water away in a downward direction.

The walls of the wagon are preferably provided with a plurality of reinforcements which is of great importance in view of the high pressing force exerted by the advancing member via the crop pushed into the receptacle. It has been found that, when an advancing member is used which pushes the crop in an approximately horizontal direction into the receptacle, no conveying means on the floor are required, since the tines pushing on the crop horizontally can fill the whole receptacle 10 without the need for further means. It is required, however, for the inner walls of the receptacle 10 to be as smooth as possible, while the top has to be completely closed so that a minimum of friction is produced between the walls and the crop. The profiled reinforcements in the sidewalls are proportioned so that they can withstand the laterally working pressing force to the optimum extent. Since the inner walls are slightly inclined in upward direction, the crop located near the top of the receptacle can readily drop down. The base of the receptacle formed by the floor 8 and the substantially U-shaped beams 54 is particularly reinforced near the corners of the U-shape by the stiffening beams 57. These beams have a very advantageous effect with respect to the high pressure and to the high loading capacity of the wagon of about 10,000 kgs. The U-shaped construction of the lower part of the receptacle joins the U-shaped construction of the upper part of the wagon, the two pairs of limbs of the U-shaped structures joining one another near the beams 66. This is also advantageous to absorb the high lateral pressure.

Figure 7:
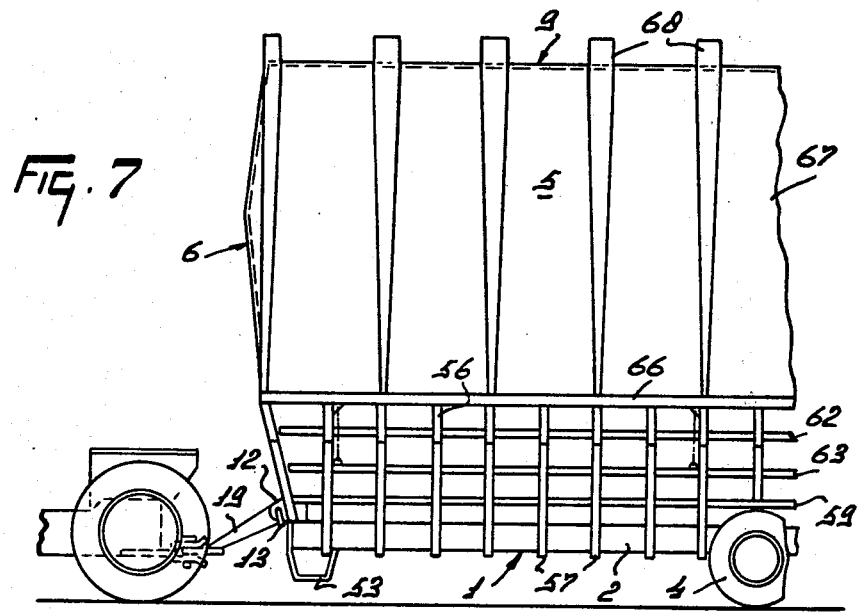
FIG. 7 is a side view of the feeding wagon of FIG. 1 shown without the crop feeder.

After the wagon is loaded, it can be conveyed towards the cattle feeding site, where the crop feeder 11 is uncoupled and removed and the wagon is left with the cattle. The crop feeder may be utilized for loading a further wagon, while the cattle are feeding on the first load. On the basis of a comsumption of 20 kgs of crop a day for one cow, the wagon, having a capacity of about 10,000 kgs, can feed one hundred cows for a period of five days. The feeding site of the cattle may be an open cow barn or a meadow and, if desired, the wagon may be conveyed to another place without re-coupling the crop feeder 11 (FIG. 7).

Owing to the efficiency of the feeding system described the labor requirements for feeding cattle, which is at present still high, can be reduced considerably. Moreover, the material required in this feeding system is effectively employed. In addition, the quantity of crop lost with this system is at a minimum, since the crop is picked up directly from the field and loaded in the wagon, where it is protected from bad weather, while without intermediate storage the crop is fed directly to the cattle so that crop loss is minimized. Even during feeding the crop is left in the wagon until eaten.

This crop feeding or forage wagon illustrated in FIGS. 8–11 has a frame 101 that includes two frame beams or frame portions 102, located one on each side of the wagon and extending in the direction of length of the wagon, these beams being interconnected near the front by a frame beam or portion 103. The frame portions 102 and 103 are preferably formed by hollow beams. Viewed in plan, the frame 101 has approximately the shape of a U, the portion 103 forming the web between the limbs. Thus the rear part of the frame is quite open. The rear ends of the beams 102 are formed by rearwardly diverging, plate-shaped guiding parts 104 arranged symmetrically to the direction of travel A, each portion comprising an intermediate piece 105 joining the beam 102 at an angle of about 65° and an end piece 106 at an angle of about 15° to the beam 102. The wagon is supported from a plurality of wheels 107. The wagon is preferably provided with a total of eight wheels 107, which are arranged in pairs on an axle 108 so that the wheels 107 are located on either side of the beam 102. In this way four pairs of wheels are provided.

At the corners formed by the beams 102 and 103 guide plates or guide means 109 are provided, their shape being triangular, viewed in plan.

The front of the frame beam 103 is provided with a crop feeder 110 formed by a pick-up member 111 and a conveying member 112. The members 111 and 112 are secured with the aid of two upright plates 113 (FIG. 10) arranged on either side of the crop feeder and extending upwardly away from the beam 103. Near the bottom of the plates 113 a drum is provided with spring steel tines 115, the drum with the tines forming the pick-up member 111. The drum is journalled by means of a shaft 116 extending transversely of the direction of travel A and substantially in a horizontal direction. The tines 115 are disposed in known manner (not shown) so that during rotation about the shaft 117 of the drum 114 in the direction of the arrow B (FIG. 10) they are directed at least substantially radially near the lower part of their path, whereas near the top part of their path the tines 115 are tangentially directed.

Between the side plates 113 a preferably hollow shaft 118 extends parallel to the shaft 116. The shaft 118 has secured to it a plurality of tines 119, arranged viewed in plan in a row side by side and which, viewed from the side, extend downwards away from the shaft 118. A coupling arm 120 is pivoted to the top end of each tine 119. The ends of the arms 120 remote from the tines 119 are pivotally coupled with a hollow beam 121, which covers the whole width of the crop feeder 110. The beam 121 constitutes at the same time a fastening part for a hood 122, which protects the top of the crop feeder.

The crop feeder 110 is driven from a tractor or other prime mover with the aid of an auxiliary shaft 123, which is coupled with a gear box 124, on either side of which an output shaft 125 is driven, the shaft 125 being parallel to the shaft 116. The shaft 125 is provided on either side of the feeder 110 with a rope or belt transmission (not shown) driving the pick-up member 111. The shaft 125 is provided at each of its ends with a gear wheel 126 (FIG. 11), which is drivably in mesh with a gear wheel 127 driving a shaft 128, which is parallel to the shaft 116. Each shaft 128 has a gear wheel 129, which drives the tines 119 in the direction of the arrow C in FIG. 10 by means of a gear wheel 130 co-operating with the gear wheel 129, the gear wheel 130 being secured to a shaft 131, which is also parallel to the shaft 116.

On the bottom the conveying member is protected by a plurality of relatively spaced, tubular guide elements 132, located in between the tines 119. The pick-up member 111 is protected by guide brackets 133, located in between the rows of tines 115. In the space between the element 132 and the bracket 133 the crop is vigorously pushed to the rear in a substantially horizontal direction.

Figure 10:
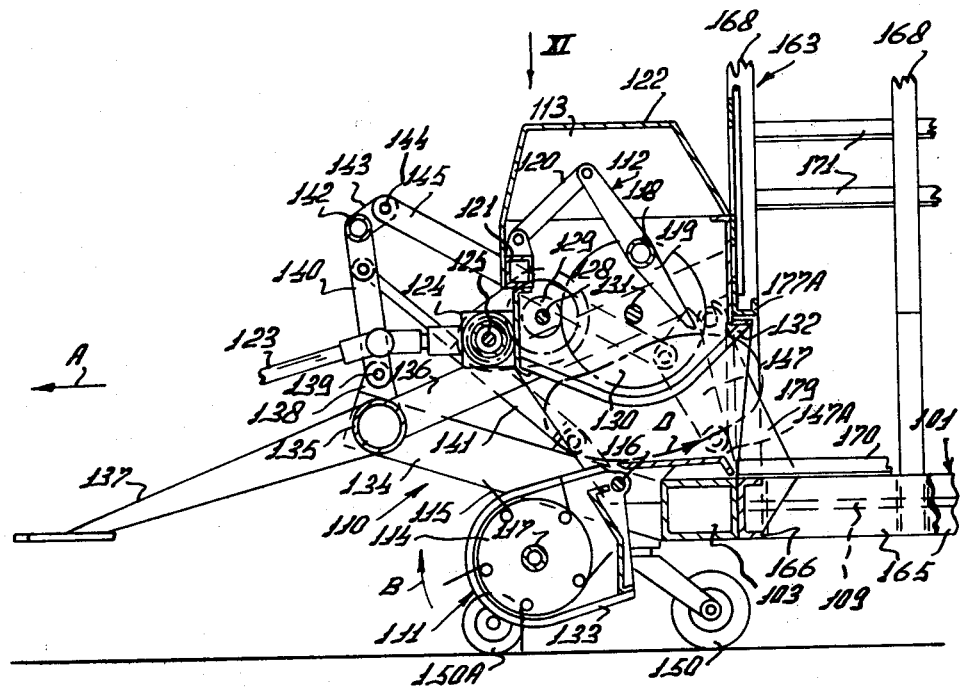
FIG. 10 is an enlarged, longitudinal, sectional view of a foremost part of the wagon shown in FIG. 8.

On either side of the crop feeder 110 there is provided an auxiliary frame comprising two beams 134, secured to the front of the beam 103 and extending away from the beam 103 in slightly upward direction. The foremost ends of the beams 134 are interconnected by a hollow tube 135. On the rear of the tube 135, on either side of the crop feeder 110, two supporting members 136 extend rearwardly and upwardly and hold the plates 113 on the sides. The front of the tube 135 is provided with a drawbar 137, which can be attached to the coupling point of the tractor. Near the lateral ends of the tube 135 tags 138 (FIG. 14) are provided, each of which holds a pivotal arm 140 by means of a shaft 139, the arms 140 extending as shown in FIG. 10, upwards and slightly forwards in the direction of travel A. Near the top of each of the arms 140 one end of a hydraulic cylinder 141, actuated from the tractor, is pivotally arranged. Each hydraulic cylinder 141 is pivoted by the end remote from the associated arm 140 to two parallel tags 138A secured to the top of the beams 134. The arms 140 are interconnected above the coupling point of the cylinder 141 by a hollow tube 142 extending parallel to the tube 135.

At a distance from the lateral end of the tube 142 a tag 143 is welded to the top side of the tube 142. Through the tag 143 is passed a pin 144, from which two substantially parallel, strip-shaped arms 145 extend rearwardly and inwardly. Viewed from the side (FIG. 10), the arms 145 are interconnected approximately above the beam 103 by a shaft or pin 146, which is passed through a hole near a corner of a plate 147 of substantially triangular shape, viewed from the side. The plate 147 is pivotally supported at another corner by two tags 147A and a shaft located in between. The two tags 147A are secured to the top of the beam 103. Near the third corner of the plate 147, which forms a swash plate and serves together with the hydraulic cylinder 141 as a coupling means, a slot-like opening 148 extends from the top in downward and rearwardly inclined direction, viewed from the side (FIG. 10).

Plates 149 are secured to the sides of the beam 134 on each side of the wagon. The plates 149 serve as supports for ground wheels 150 on each side of the wagon, these wheels being adjustable in a direction of height with the aid of an adjusting mechanism 151. The pick-up member 111 is supported on either side by supporting wheels 150A.

In approximately the same manner as at the front of the wagon, a hydraulic cylinder 153, actuated from the tractor, is located above the pairs of wheels 107 between tags 152 on each side of the wagon (FIG. 15). The tags 152 are secured to the top of the beam 102 and the hydraulic cylinder 153 is inclined upwardly and forwardly with respect to the direction of travel A away from a pivotal shaft 154 passed through tags 152. The piston rod of the hydraulic cylinder 153 is connected with the top ends of the arms 155, which extend downwardly on either side of the beam 102 and are pivotally connected with the lower side of the beam 102. The connection between the piston rod of the cylinder 153 and the arm 155 is formed by a pivotal shaft 156, which couples arms 157 with the cylinder 153. Viewed in side elevation (FIG. 15) the arms 157 extend approximately in a horizontal direction on either side of the cylinder 153 to the rear as far as, viewed in plan (FIG. 16) beyond the beam 102, viewed in the direction of travel A, where the arms 157 are interconnected by a pivotal shaft 158, which is surrounded by a sleeve 159, which is rigidly secured to a plate 160, which is similar to the plate 147 in FIG. 14. Viewed in side elevation (FIG. 15) the plate 160 has a substantially triangular shape and is secured to ears 161 secured to the rear end of the beam 102.

In normal operation a slot-like opening 162 near one of the corners of the plate 160 serving as a swash plate and forming a coupling means together with the hydraulic cylinder 153, extends, viewed in side elevation (FIG. 8), in the coupled state, from the top in downward direction and to the rear with respect to the direction of travel A.

Figure 11:
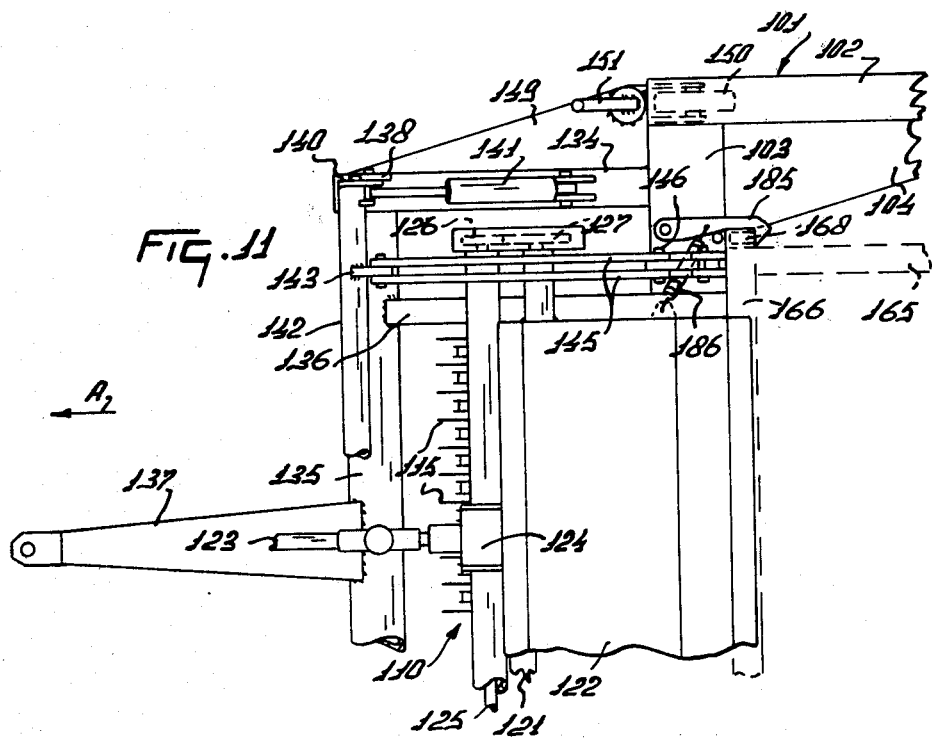
FIG. 11 is a plan view of part of the wagon of FIGS. 8 to 10 taken in the direction of the arrow XI in FIG. 10 with the crop receptacle uncoupled and removed.
Figure 12:
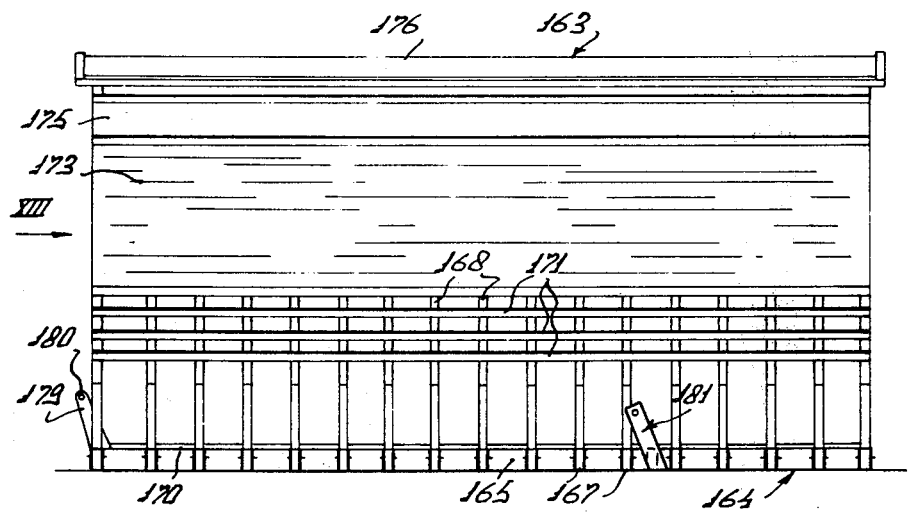
FIG. 12 is a side view of a crop receptacle such as can be coupled to the wagon of FIGS. 8 to 11.
Figure 13:
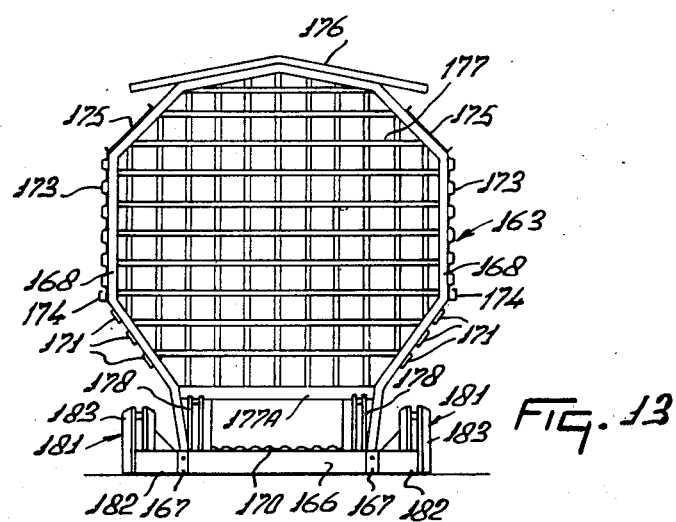
FIG. 13 is a front view of the receptacle of FIG. 12, taken in the direction of the arrow XIII in FIG. 12.

The wagon comprises furthermore a crop receptacle 163, arranged on a frame 164 (FIG. 12). This frame 164 comprises girders 165 extending in the direction of length of the wagon and transverse girders 166. The width of the transverse girders 166 and hence of the frame 164 approximately corresponds to the smallest distance between the guide plates 109 at the front of the wagon (FIG. 11). The sides of the girders 165 are provided at equal intervals with holders 167 of rectangular shape, viewed on plan, for accommodating tubular supporting elements 168. The elements 168 are preferably mounted by means of pins 169 in the holders 167 so as to be readily detachable. Each element 168 is curved, viewed in the direction of travel A in FIG. 13, so that an approximately omegashape form is obtained. Each element 168, which is preferably made from light-weight tubing, extends initially upwards and slightly outwards and is bent after some distance through an angle of 45° to the horizontal plane to the outer side. Approximately halfway up the height of the receptacle where the receptacle has a width of about 3.5 meters each element 168 is approximately at right angles to the horizontal plane and extends upwardly. At the height of the roof each element 168 is bent downwardly (FIG. 13). The receptacle preferably has seventeen steel structures of this kind.

The floor of the receptacle is preferably formed by a corrugated plate 170, arranged so that the corrugations extend in the direction of length of the receptacle. It is advantageous to cause the corrugated plate to slope slightly down near the outer sides. The sidewalls of the receptacle are formed near the bottom by a plurality of horizontal, tubular bars 171, for example, three covering the whole length of the receptacle. The space between the bars 171 and the corrugated plate floor 170 may be completely open, but in accordance with the nature of the crop to be loaded it is advantageous to provide a slide 172 between the elements 169, for example, a slide of thin sheet material or a synthetic resin, adapted to move in a direction of height to form a free opening. To the substantially perpendicular portions of the elements 168 corrugated plates 173 are secured so that the corrugations extend in the direction of length of the receptacle 163. A water draining gutter 174 is preferably provided between the sidewall formed by the corrugated plates 173 and the bars 171. The roof portion located above the corrugated plates 173 and joining the plates 173 is formed by light-weight, U-shaped sheet material 175 extending away from the plates 173 over a distance along the elements 168 up to a small distance from the highest portion of the roof so that, as shown in FIG. 13, an opening is formed throughout the length of the receptacle between the sheet material 175 and the remainder of the roof. The topmost part of the roof is formed by a slightly V-shaped plate 176, which covers the opening between the sheet material by means outwardly extending parts, viewed on plan.

The front and rear sides of the receptacle are closed by a mesh 177, preferably of comparatively strong material. Near the front of the receptacle an opening is left near the bottom for the advancement of crop into the receptacle.

Near the front of the receptacle 163 two supporting parts 178 are fastened between the elements 168 (FIG. 13). The supporting parts 178 are formed each by two relatively parallel portions 179 extending away from the transverse girder 166 in upright direction and, viewed in the direction of travel A, to the front (FIG. 14). Near the top ends the portions 179 are interconnected by a shaft or pin 180. The shaft 180 is formed so that during the coupling operation it can slide in the slot-like opening 148 of the swash plate 147. In a similar manner supporting parts 181 are provided at a distance in front of the rear end of the receptacle. However, contrary to the parts 178, the supporting parts 181 are located, viewed in side elevation (FIG. 13), at a distance beyond the supporting elements 168 and are secured to an outwardly extending transverse beam 182 (FIG. 15). The supporting parts 181 comprise two upwardly extending, stripshaped portions 183 bent over at right angles and extending away from the beam 182 in upward direction and obliquely to the front with respect to the direction of travel A, substantially similar to the portions 179. Near the top the portions 183 hold a shaft or pin 184 between them, the shape of this shaft being such that during the coupling operation it gets into the slot-like opening 162 of the swash plate 160.

On each side of the swash plates 147 claws 185 are arranged on the beam 103 so as to be pivotable about upright shafts. After the receptacle 163 is coupled, the claws grip around one of the foremost elements 168 with the aid of tensile springs 186.

The wagon shown in FIGS. 8–16 operates as follows.

The wagon can be attached by means of the drawbar 137 to a tractor or a similar vehicle and in operation it can be moved in the direction of travel A. For coupling the receptacle 163 with the frame of the wagon the receptacle 163 is provided both near the crop feeder 110 and near the ground wheels 107 with upwardly extending supporting portions 179 and 181 respectively having a horizontal shaft or pin 184. The shafts 180 and 184 respectively constitute coupling points for the receptacle for attachment to the coupling means on the frame 101. When the wagon has to be coupled with the receptacle 163, first the swash plates 147 and 160 are turned rearwardly with respect to the direction of travel A, with the aid of the hydraulic cylinders 141 and 153 respectively, so that the slot-like openings 148 and 162 respectively occupy a horizontal, rearwardly extending position (see FIGS. 14 and 15). In order to have these movements of the swash plates 147 and 160 performed in synchronism, the cylinders 141 and 153 are preferably hydraulically coupled with one another. After this operation the wagon is maneuvered towards the receptacle 163 standing on the ground. Subsequently the U-shaped frame 101 is driven around the receptacle 163, the guide plates 109 taking care of a correct coupling in the last coupling phase, since the receptacle can slide along the plates 109. During the coupling operation the plate-shaped guide parts formed by the parts 105 and 106 operate as guides for the upright supporting portions 181 so that the receptacle can be accurately coupled also on the rear. After completion of the first phase of the coupling operation the lifting device comprising the hydraulic cylinders 141 and 153 is actuated and owing to the resultant outward movement of the piston rods of the cylinders the swash plates 147 and 160 move in the direction of the arrows E and F respectively. During this movement the receptacle is lifted from the ground by means of the coupling means operating as a lifting device and connected on the frame of the wagon. Finally, also under the action of the springs 186, the claws 185 ensure an immovable coupling in the various directions. The final positions of the slot-like openings 148 and 162 after the coupling operation, these openings being inclined upwardly in the direction of travel A, contributes to a satisfactory fixation also in a direction of height. In this way the receptacle 163 can be readily coupled by only one person from the tractor and deposited on the wagon frame 101.

The location of the rearmost coupling means on the beams 102 between the wheels 107 on either side of said beams 102 can contribute to a very satisfactory absorbtion of forces exerted on the wagon frame so that harmful torsional forces on the frame 101 can be avoided. After coupling the inlet opening in the front wall 177 (FIG. 13) occupies, with respect to the conveying member 112, a position such that the wagon is ready for receiving the crop, which can thus be inserted into the receptacle 163. The operational parts of the crop feeder 110 i.e. the pick-up member 111 and the conveying member 112, can be driven by the power take-off shaft of the vehicle moving the wagon through the auxiliary shaft 123 and the further transmission gear. The drum 114 of the pick-up member 111 rotates in the direction of the arrow B and the tines 119 on the shaft 118 rotate in the direction of the arrow C, the free ends of the tines 119 moving along a reniform path so that the crop is vigorously pushed in a substantially horizontal direction into the receptacle 163. If it is desired with regard to the nature of the crop, knives may be arranged in a manner not shown in the path of the tines for cutting up the crop. In loading, the design of the floor plate 107 contributes to an advantageous displacement of the picked-up crop to the rear.

When loading short-stemmed crop it may be advantageous temporarily to close the openings in the lower side of the sidewall near the crop feeder. This can be done with the aid of the plates 172. The vigorous conveying member 112 pushes the crop up to the rear wall of the receptacle. At the same time the crop is pushed upwardly so that the whole receptacle will be completely filled with crop.

When the receptacle 163 is filled to the desired extent, it can be uncoupled by causing the swash plates 147 and 160 by means of the cylinders 141 and 153 respectively to turn in directions opposite the arrows E and F respectively so that the receptacle is lowered towards the ground. When the receptacle is standing on the ground, it is only necessary to drive the wagon frame 101 forwards for achieving disengagement. After the receptacle is deposited on the ground, a further receptacle may be coupled with the wagon frame 101 in order to continue harvesting of fodder without loose of time.

The filled receptacle 163 is suitable as a storage for preserving the crop for some time and in addition for feeding crop to the cattle. The cattle can feed after any slides 172 have been opened, the fodder being drawn by the cattle through the openings in the lower parts of the sidewalls. In order to minimize losses of fodder, the floor plate 170 may be spherical or wedgeshaped. Humidity from the ground cannot penetrate through the closed floor 170. Since the receptacle 163 has a covering roof, below which a gap is left for ventilation, and since the receptacle 163 has meshes at the front and the rear, a satisfactory circulation of air across the receptacle 163 is ensured, which has a favorable effect on a preservation of the loaded crop for a longer time. Owing to the inclined sidewalls near the bottom of the receptacle the crop cannot become wet near the feeding opening, while the aeration is improved. In this way an effective one-man operational cycle can be performed with minimum loss of fodder, since after the operations on the field the crop is directly fed to the cattle. Moreover, the user can employ the wagon for many further purposes, since other types of receptacle may also be coupled thereto.

Owing to the large dimensions of the receptacle, whose width is about 3.5 meters and whose height is also about 3.5 meters, very large quantities of crop can be loaded; in accordance with the kind of crop and the moisture content 10,000 to 30,000 kgs of crop can be loaded.

In the embodiment shown in FIG. 17 the receptacle has on the lower side, the same construction as in the first embodiment, but the roof is formed by preferably a circular bent-over corrugated plate 187 of, preferably, thin steel sheet or a synthetic resin. The corrugations extend transversely of the direction of length of the receptacle. In this manner a comparatively cheap, but strong receptacle is obtained, which may be very attractive in the event of a need for a plurality of alternating troughs. The corrugations ensure in addition a satisfactory drainage of water.

FIG. 18 shows another embodiment of a receptacle, which may be employed not only for feeding cattle but also for other purposes. Near the floor an outlet member 188 is provided in the form of a worm conveyor, the floor sloping down thereto in an approximately funnel-shaped fashion. The floor 189 is supported from supporting elements 168. The remainder of the walls 190 is self-supporting and completely closed apart from an opening 191 on the top of the receptacle, which can be closed. The receptacle shown in FIG. 18 is an example suitable for many other purposes than feeding cattle, for example, for transporting bulk goods such as cereals. Such receptacles ensure a high efficiency of the wagon system.

FIG. 19 shows an alternative embodiment of the wagon, in which the frame 101 is provided at the front with a mowing device 192, which comprises in this embodiment cutter elements 193 adapted to rotate about upright shafts. Approximately midway the length of the wagon frame a crop feeder 194 is arranged, the construction of which is mainly identical to the crop feeder 110 already described, but herein it is completely arranged beneath the floor of the receptacle 195. The receptacle 195 is largely identical to the receptacle 163 already described, but it is differently coupled with the wagon frame 101. The coupling is performed by means of hydraulic compression cylinders in the shape of hydraulically extensible legs 196. The floor of the receptacle 195 is preferably equipped with bottom flaps 197, adapted to turn about horizontal shafts extending in the direction of length of the receptacle and being located near the sides of the receptacle 195. As is shown in FIG. 20, the bottom flaps 197 can be turned over a controllable distance towards the ground in the direction of the arrow G by means of an adjusting mechanism (not shown).

The receptacle 195 shown in FIG. 19 and 20 permits of mowing and loading crop in a single run. It is furthermore possible, after the mowing device 192 is switched off to employ the receptacle in this embodiment only for loading purposes. It may be very advantageous for the crop feeder 194 to be arranged at a distance from the front of the wagon with a view to the effective possibilities of inserting crop into such a receptacle. Since the recepticle is equipped with extensible legs 196, it can be disposed at a desired height above the ground. It is then advantageous that a certain space is left beneath the floor of the receptacle, so that the cattle can attain the crop beneath the floor or can draw it from the floor after the bottom flaps 197 have been turned open to a suitable extent. If desired, the sidewalls may be completely closed as shown in FIG. 18. It is furthermore possible to provide the receptacle 163, already described, with pivotable sidewalls similar to the bottom flaps 197 of FIG. 19. Other combinations of the embodiments described may be utilized, for example, an outlet member as shown in FIG. 18 may be provided on the floor of the receptacle 163 of FIG. 8.

While various features of the cattle feeding wagons, and parts associated therewith, which have been described, and are illustrated in the drawings, are be set forth in the following claims as inventive features, it is to be noted that the invention is not necessarily limited to these features and that it may encompass all features which have been described both individually and in various combinations.

Having described my invention, what I claim as new and novel and desire to secure by Letters Patent of the United States is:

1. A feeding wagon for cattle comprising a substantially horizontally disposed frame and forward and rearward ground wheels on said frame supporting said frame above the ground, a crop containing receptacle being mounted on said frame, said receptacle having a pair of side walls and a substantially flat as seen from the side floor, each wall having a plurality of beam means extending upwardly from said floor secured to a horizontal beam in their higher aspects above said floor, said beam means arranged through the length of said receptacle and defining opening means in said receptacle of a height and width whereby crop within the receptacle is accessible through said opening means to cattle from outside thereof beginning at the level of said floor and above, said receptacle having forward and rearward end walls for containing crop therein, said forward end wall defining an entrance substantially at the level of said floor, a crop feeding device adjacent said entrance that is adapted to move crop into said receptacle at the level of said floor for loading said wagon from the floor up, said device being coupled to the forward end of said frame by coupling means and comprising a pick-up member for picking crop up off the ground and an advancing member positioned to cooperate with said pick-up member and move crop through said entrance into the receptacle in a substantially horizontal direction.

2. A feeding wagon as claimed in claim 1, wherein said feeding device is detachably coupled to said receptacle with said coupling means.

3. A feeding wagon as claimed in claim 2, wherein the feeding device is supported on an auxiliary frame.

4. A feeding member as claimed in claim 3, wherein said auxiliary frame has at least one supporting ground wheel.

5. A feeding wagon as claimed in claim 3, wherein said feeding device is turnable about at least one horizontal pivotal axis.

6. A feeding wagon as claimed in claim 5, wherein said horizontal pivotal axis coincides with said coupling means.

7. A feeding wagon as claimed in claim 6, wherein said feeding device is coupled to said receptacle with a hydraulic cylinder.

8. A feeding wagon as claimed in claim 7, wherein said hydraulic cylinder is pivotally connected to the feeding device by an arm and pivotable about a second horizontal pivotal axis.

9. A feeding wagon as claimed in claim 8, wherein said hydraulic cylinder is connected to turn the wagon, with respect to said feeding device, about said second pivotal axis with said arm.

10. A feeding wagon as claimed in claim 9, wherein a draw bar is connected to the feeding device, adjacent the front thereof.

11. A feeding wagon as claimed in claim 3, wherein said advancing member has tine that push crop in a substantially horizontal direction through said entrance into the receptacle.

12. A feeding wagon as claimed in claim 11, wherein said feeding device has a single row of tine.

13. A feeding wagon as claimed in claim 11, wherein said pick-up member has a tined cylindrical roller.

14. A feeding wagon as claimed in claim 3, wherein, viewed in a direction transverse to the direction of operative travel of said wagon, the pick-up member is located in front of said advancing member, at least in part.

15. A feeding wagon as claimed in claim 3, wherein said pick-up member is connected to said auxiliary frame by pivot means having a horizontal axis.

16. A feeding wagon as claimed in claim 3, wherein the front of said auxillary frame is supported on at least one wheel and said wheel is located adjacent the pick-up member.

17. A feeding wagon as claimed in claim 3, wherein the rear part of said feeding device is pivotable about a horizontal axis with respect to the remainder thereof.

18. A feeding wagon as claimed in claim 3, wherein crop can be withdrawn from said receptacle, said floor comprising plate means from which all crop can be taken by the cattle from said receptacle through said opening means.

19. A feeding wagon as claimed in claim 18, wherein said opening means the opening in said walls are closeable by rod means on said receptacle.

20. A feeding wagon as claimed in claim 18, wherein at least the lower part of one said side wall adjacent said floor is located closer to the vertical longitudinal plane of symmetry of said wagon than the upper part of said side wall.

21. a feeding wagon as claimed in claim 20, wherein the angle between said lower part of the sidewall and a horizontal plane, is about 65°.

22. A feeding wagon as claimed in claim 18, wherein said walls comprise mesh openings.

23. A feeding wagon as claimed in claim 22, wherein said mesh openings are formed by a chain network.

24. A feeding wagon as claimed in claim 23, wherein the dimensions of the mesh openings are about 15×15 cms.

25. A feeding wagon as claimed in claim 22, wherein the mesh openings are provided at equal intervals along the length of said wagon.

26. A feeding wagon as claimed in claim 18, wherein at least part of the sidewalls of said wagon have an outwardly extending feeding gutter.

27. A feeding wagon as claimed in claim 26, wherein viewed on plan and transversely of the direction of travel, the width of said gutter substantially corresponds with the width of the lower parts of said sidewalls and said lower part is apertured.

28. A feeding wagon as claimed in claim 18, wherein said receptacle has a closed roof.

29. A feeding wagon as claimed in claim 28, wherein said roof adjoins upper parts of said walls and those parts are made from sheet material.

30. A feeding wagon as claimed in claim 1, wherein said sidewalls are fitted with profiled reinforcements.

31. A feeding wagon as claimed in claim 30, wherein said reinforcements extend upwardly and have a larger sized horizontal sectional area adjacent the top of the receptacle that the bottom thereof.

32. A feeding wagon as claimed in claim 31, wherein said reinforcements extend downwards from said top to apertured lower parts of said walls.

33. A feeding wagon as claimed in claim 32, wherein said wagon is rectangular and said reinforcements are connected with a horizontal U-shaped beam which extends in the direction of length of the wagon, to conduct water away.

34. A feeding wagon as claimed in claim 31, wherein said reinforcements and corresponding walls are made from an integral length of sheet material.

35. A feeding wagon as claimed in claim 34, wherein said reinforcements are prolonged to extend along the roof of said receptacle and are located on the outer side thereof.

36. A feeding wagon as claimed in claim 35, wherein viewed in the direction of travel, the reinforcements form upper U-shaped structures.

37. A feeding wagon as claimed in claim 36, wherein the lower part of said receptacle, including the floor, form a lower U-shaped structure with stiffened parts at the corners thereof.

38. A feeding wagon as claimed in claim 37, wherein said upper and lower U-shaped structures extend transversely of the direction of length of said wagon, and the two structures are joined adjacent the limb ends thereof.

39. A feeding wagon as claimed in claim 37, wherein said structure includes tubular beams that comprise lower parts of said walls.

40. A feeding wagon as claimed in claim 37, wherein adjacent the top, stiffened parts of said receptacle are connected with said lower U-shaped structure.

41. A feeding wagon as claimed in claim 40, wherein rods bear on the inner side of said tubular beams.

42. A feeding wagon as claimed in claim 37, wherein stiffened parts of said lower U-shaped structure are formed by stiffening beams bent in the shape of a U and positioned substantially beneath the receptacle.

43. A feeding wagon as claimed in claim 41, wherein said tubular beams are open adjacent the bottom of the wagon.

44. A feeding wagon as claimed in claim 18, wherein said floor is a steel sheet.

45. A feeding wagon as claimed in claim 44, wherein at least part of said sheet is ridged in the middle thereof.

46. A feeding wagon as claimed in claim 45, wherein the angle between at least part of the floor sheet and the horizontal is about 7.5°.

47. A feeding wagon as claimed in claim 3, wherein extensible supports are connected to the bottom of said wagon.

48. A feeding wagon as claimed in claim 3, wherein said wagon has a length of about 8.5 ms, a width of about 2.5 ms and a height of about 4.5 ms.

49. A feeding wagon as claimed in claim 3, wherein the lower part of said receptacle has sidewalls that are apertured and said lower part has a height of about one meter.

50. A feeding wagon as claimed in claim 3, wherein said entrance is in the front wall of said receptacle and said entrance has closing means.

51. A feeding wagon as claimed in claim 3, wherein said wagon is supported on each side by three ground wheels.

52. A feeding wagon as claimed in claim 51, wherein the loading capacity of the wagon amounts to about 10.000 kgs.

53. A feeding wagon as claimed in claim 1, wherein said openings in said side walls are adapted to be closed by substantially horizontally disposed rod means on said receptacle.

54. A feeding wagon as claimed in claim 30, wherein said wagon is rectangular and said horizontal beam is channel shaped whereby rainwater and the like falling on said wagon is collected by said horizontal beam and drained therefrom.

55. A feeding wagon as claimed in claim 53, wherein said side walls comprise reinforcements and comprise therewith an integral unitary length of sheet material.

56. A feeding wagon as claimed in claim 55, wherein said reinforcements are prolonged and extend along a roof of said receptacle, said reinforcements being located on the outer side of said roof.

57. A feeding wagon for cattle comprising a horizontally disposed frame, ground wheels on which said frame is mounted supporting said frame above the ground, a crop-containing receptacle mounted on said frame, said receptacle having a pair of side walls and a substantially relatively stationary flat floor as seen in side elevation, each said side wall having a plurality of vertically elongated opening means extending upwardly from substantially said floor whereby crop within said receptacle is accessible through said opening means from the outside for the feeding of cattle, said receptacle having forward and rear walls for confining crop therein, said forward wall defining an entrance which has its bottom substantially at the level of said floor, a crop feeding device connected to said receptacle adjacent said entrance which is adapted to move crop into said receptacle at the level of said floor for loading said wagon from floor up, said device being coupled to the forward portion of said frame by coupling means and comprising a pick-up member for gathering crop from the ground and an advancing member positioned to cooperate with said pick-up member and move crop through said entrance into said receptacle in a substantially horizontal direction.

58. A feeding wagon for cattle comprising a substantially horizontal frame which is mounted on forward and rear ground wheels which support said frame above the ground, a cropcontaining receptacle mounted on said frame, said receptacle having a pair of side walls and a substantially flat as seen from the side floor, a plurality of opening means disposed along said side walls defined by beams extending upwardly from said floor whereby crop at the floor level and above within said receptacle is accessible from the outside for feeding cattle, said receptacle having forward and rear walls for confining the crop therein, said forward wall defining in its lower portion an entrance the bottom of which is substantially at the level of said floor, a crop feeding device adjacent said entrance which is adapted to move crop into said receptacle through said entrance at the level of said floor and to load said receptacle with crop from the bottom thereof up, said crop feeding device being coupled to said frame at its forward end by coupling means and comprising means for picking crop off the ground and an advancing member positioned to cooperate with said pick-up member and press crop through said entrance into said receptacle in a substantially horizontal direction.

59. A feeding wagon for cattle comprising a substantially horizontal frame which has forward and rear ground wheels connected thereto which support said frame above the ground, a receptacle for receiving crop mounted on said frame, said receptacle having side walls and a substantially level floor as seen from the side, said side walls defining a plurality of openings beginning substantially at the level of said floor through which crop within said receptacle at the level of said floor and above is readily accessible from the outside for feeding cattle, said receptacle having forward and rear walls for confining crop therein, said forward wall defining at its lower edge an entrance for receiving crop which has its bottom substantially at the level of said floor, a crop feeding device adjacent said entrance for moving crop into said receptacle at the level of said floor whereby crop is pressed into said wagon for loading same from the floor up, said device being coupled to the forward end of said frame by coupling means and including means for picking crop off the ground and means for pressing crop picked up by said pick-up means through said entrance into said receptacle in a substantially horizontal direction.

60. A feeding wagon for cattle comprising a substantially horizontal frame which is supported by ground wheels connected thereto and has a receptacle for receiving crop mounted thereon, said receptacle having side walls and a substantially horizontal floor, said side walls defining a plurality of openings extending substantially from the level of said floor upwardly through which crop within said receptacle is accessible from the outside for feeding cattle, said receptacle having forward and rear walls for confining said crop therein, said forward wall defining at its lower edge an entrance for receiving crop which has its bottom substantially at the level of said floor, a crop feeding device connected to said frame for moving crop into said receptacle through said entrance at the level of said floor whereby crop is pressed into said wagon for loading same from the floor up, said feeding device including means for picking crop off the ground and means for pressing crop gathered by said pick-up means into said entrance in a substantially horizontal direction.

* * * * *